United States Patent
Liu

(10) Patent No.: US 10,427,205 B2
(45) Date of Patent: Oct. 1, 2019

(54) HEADING MACHINE FOR FORMING A HEAD OF A LACE

(71) Applicant: KAE SHENG INDUSTRIAL CO., LTD., Lugang Township, Changhua County (TW)

(72) Inventor: Tsai-Chen Liu, Lugang Township (TW)

(73) Assignee: Kae Sheng Industrial Co., Ltd., Lugang Township (TW)

( * ) Notice: Subject to any disclaimer, the term of this patent is extended or adjusted under 35 U.S.C. 154(b) by 60 days.

(21) Appl. No.: 15/715,246

(22) Filed: Sep. 26, 2017

(65) Prior Publication Data
US 2019/0091755 A1   Mar. 28, 2019

(51) Int. Cl.
| | |
|---|---|
| *G06F 19/00* | (2018.01) |
| *B21D 53/58* | (2006.01) |
| *G05B 19/18* | (2006.01) |
| *A43C 9/00* | (2006.01) |

(52) U.S. Cl.
CPC ................ *B21D 53/58* (2013.01); *A43C 9/00* (2013.01); *G05B 19/188* (2013.01); *G05B 2219/45194* (2013.01)

(58) Field of Classification Search
CPC .................................................. B65H 2701/31
USPC .......................................................... 700/130
See application file for complete search history.

(56) References Cited

U.S. PATENT DOCUMENTS

| | | | | |
|---|---|---|---|---|
| 1,499,286 | A * | 6/1924 | Berolzheimer | A43D 98/00 24/712 |
| 3,859,825 | A * | 1/1975 | Foulquies | D04B 21/202 66/192 |
| 4,058,865 | A * | 11/1977 | Lee | B21J 13/14 470/140 |
| 5,353,486 | A * | 10/1994 | Schmidt | A61F 13/04 28/167 |
| 7,467,647 | B1 * | 12/2008 | Wilk | D03D 3/02 139/23 |
| 2001/0013233 | A1 * | 8/2001 | Motoya | D04B 21/10 66/85 R |

OTHER PUBLICATIONS

SUSMATEX, "Shoe Lace Making Machine", SUSMATEX, 2010, pp. 6 (Year: 2010).*

* cited by examiner

*Primary Examiner* — Suresh Suryawanshi
(74) *Attorney, Agent, or Firm* — Alan D. Kamrath; Mayer & Williams PC

(57) ABSTRACT

A heading machine includes a base unit (1), a delivery unit (2) arranged on the base unit, two holding units (3) arranged on the base unit, a drive unit (4) arranged on the base unit, a cutting unit (5) arranged on the delivery unit, a computer control unit (6) arranged on the base unit, and a power supply (7) electrically coupled to the drive unit, the cutting unit and the computer control unit to provide an electric power. Thus, the computer control unit adjusts the length of the lace (8), so that the tension of the lace is distributed evenly, and the lace that has been cut will have a constant length. In addition, the cut length of the lace is adjusted without needing manual measurement and adjustment.

12 Claims, 4 Drawing Sheets

HEADING MACHINE FOR FORMING A HEAD OF A LACE

BACKGROUND OF THE INVENTION

1. Field of the Invention

The present invention relates to a heading machine and, more particularly, to a heading machine for forming a head of a lace, such as a shoelace.

2. Description of the Related Art

A lace includes fibers and threads which are interwoven together. The front and rear ends of the lace are usually knotted during the weaving process to prevent the lace from being dispersed due to fray. A heading machine is used for forming a head of a lace (such as a shoelace), a tie, a band, a belt or the like. In operation of the conventional heading machine, the lace that has been woven is cut to have a determined length, and two plastic mounting rings are mounted on the front and rear ends of the lace to prevent the lace from being dispersed due to fray at the front and rear ends thereof. In general, the operator has to manually adjust the length of the lace and to fix the lace. Then, the lace is driven by the heading machine reciprocally, and is cut to have a determined length. The lace is covered by or mounted with a head during the cutting action, so that the lace will not be dispersed due to the fray. However, the conventional heading machine needs a manual labor to accomplish the length adjustment of the lace, thereby wasting the working time and energy, and thereby decreasing the working efficiency and precision. In addition, the operator has to measure and adjust the size of the lace, and to cut the residual part of the lace during measurement, thereby wasting the material of the lace. Further, the tension of the lace driven by the heading machine is not kept at a constant value, so that the cut lace has different length, thereby producing a size error. Further, when the length of the lace is changed, the operator has to adjust and calibrate the size again.

BRIEF SUMMARY OF THE INVENTION

In accordance with the present invention, there is provided a heading machine comprising a base unit, a delivery unit arranged on the base unit, two holding units arranged on the base unit, a drive unit arranged on the base unit, a cutting unit arranged on the delivery unit, a computer control unit arranged on the base unit, and a power supply electrically coupled to the drive unit, the cutting unit and the computer control unit to provide an electric power. The base unit includes a track device arranged transversely on an upper end of the base unit, and an adjusting frame arranged on a side of the base unit. The delivery unit delivers a lace which is wound around the adjusting frame which adjusts a tension of the lace. The two holding units are movable transversely on the track device of the base unit to pull the lace that is delivered from the delivery unit. Each of the two holding units has a holding portion for holding the lace. The drive unit is arranged on the track device of the base unit and drives the two holding units. The cutting unit cuts the lace that is stretched from the delivery unit and forms a fray check on a rear end of the lace that has been cut, to prevent the lace from being dispersed due to fray. The computer control unit is electrically coupled to the drive unit to control operation of the drive unit.

According to the primary advantage of the present invention, the computer control unit adjusts the length of the lace exactly, so that the tension of the lace is distributed evenly, and the lace that has been cut will have a constant length.

According to another advantage of the present invention, the cut length of the lace is adjusted automatically without needing manual measurement and adjustment, thereby enhancing the working efficiency of the heading machine, thereby reducing the length error, and thereby increasing the quality of the product.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
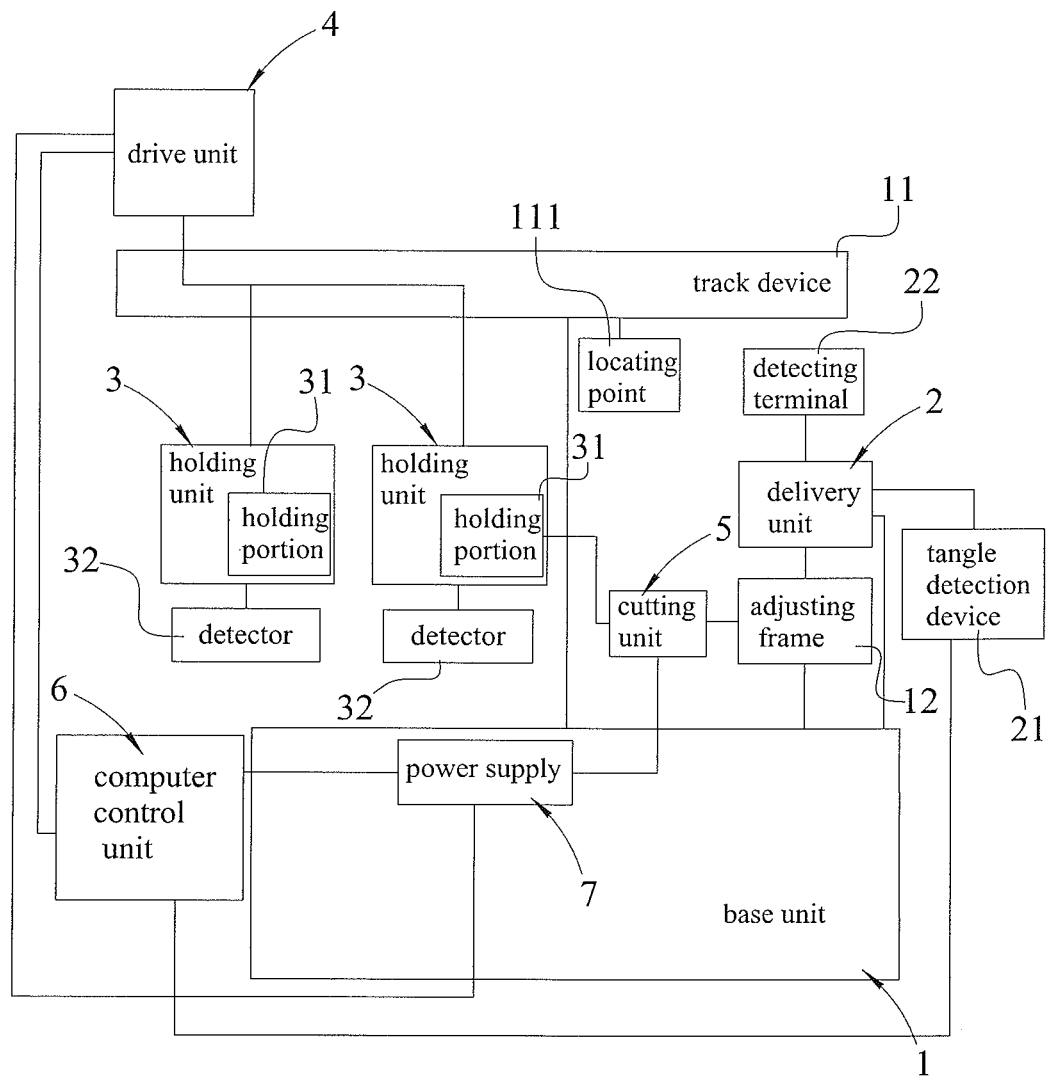
FIG. 1 is a block diagram of a heading machine in accordance with the preferred embodiment of the present invention.
Figure 2:
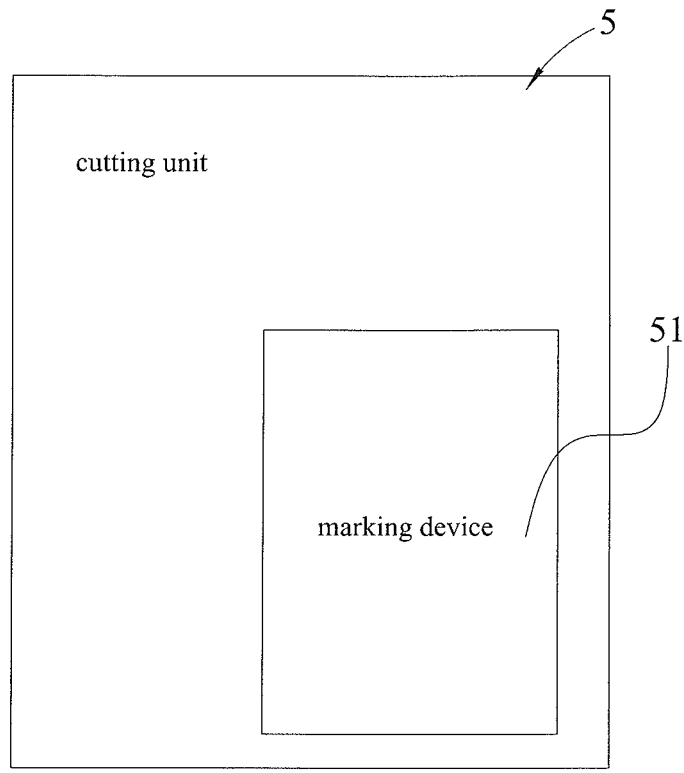
FIG. 2 is a block diagram of a cutting unit of the heading machine in accordance with the preferred embodiment of the present invention.
Figure 3:
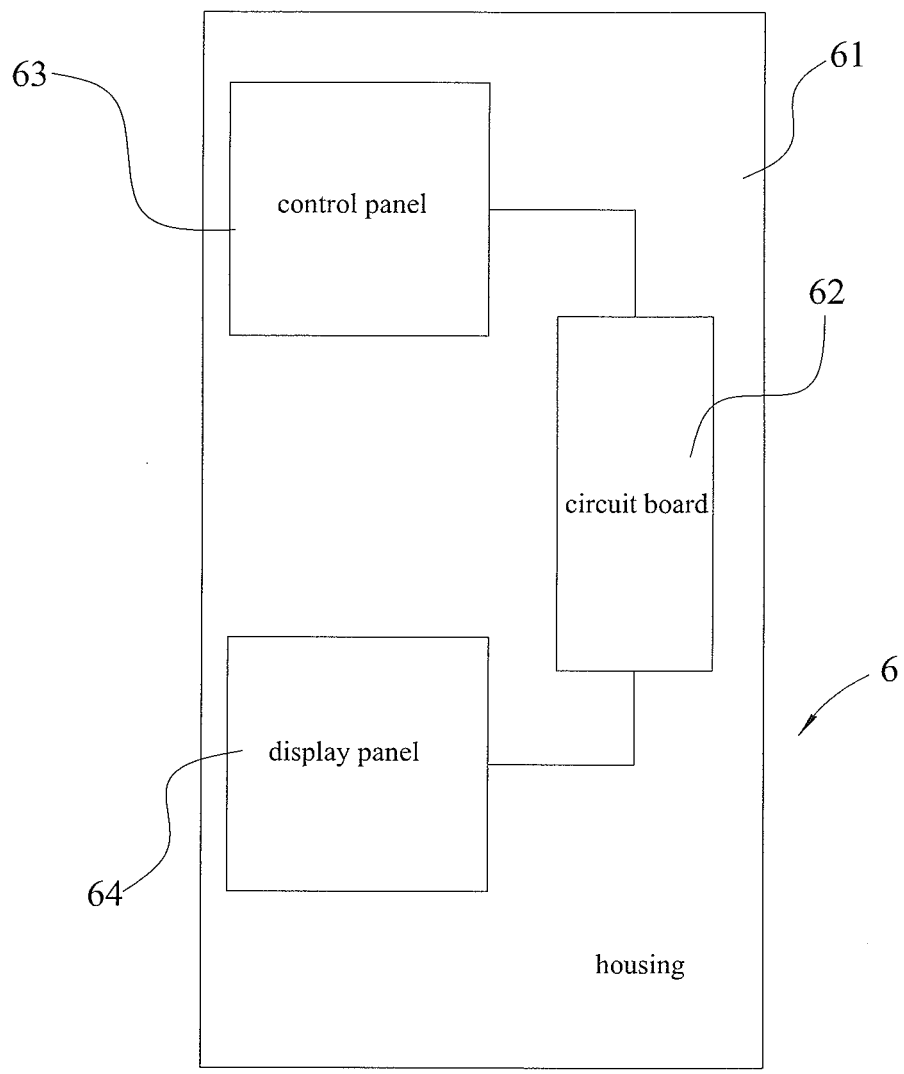
FIG. 3 is a block diagram of a computer control unit of the heading machine in accordance with the preferred embodiment of the present invention.
Figure 4:
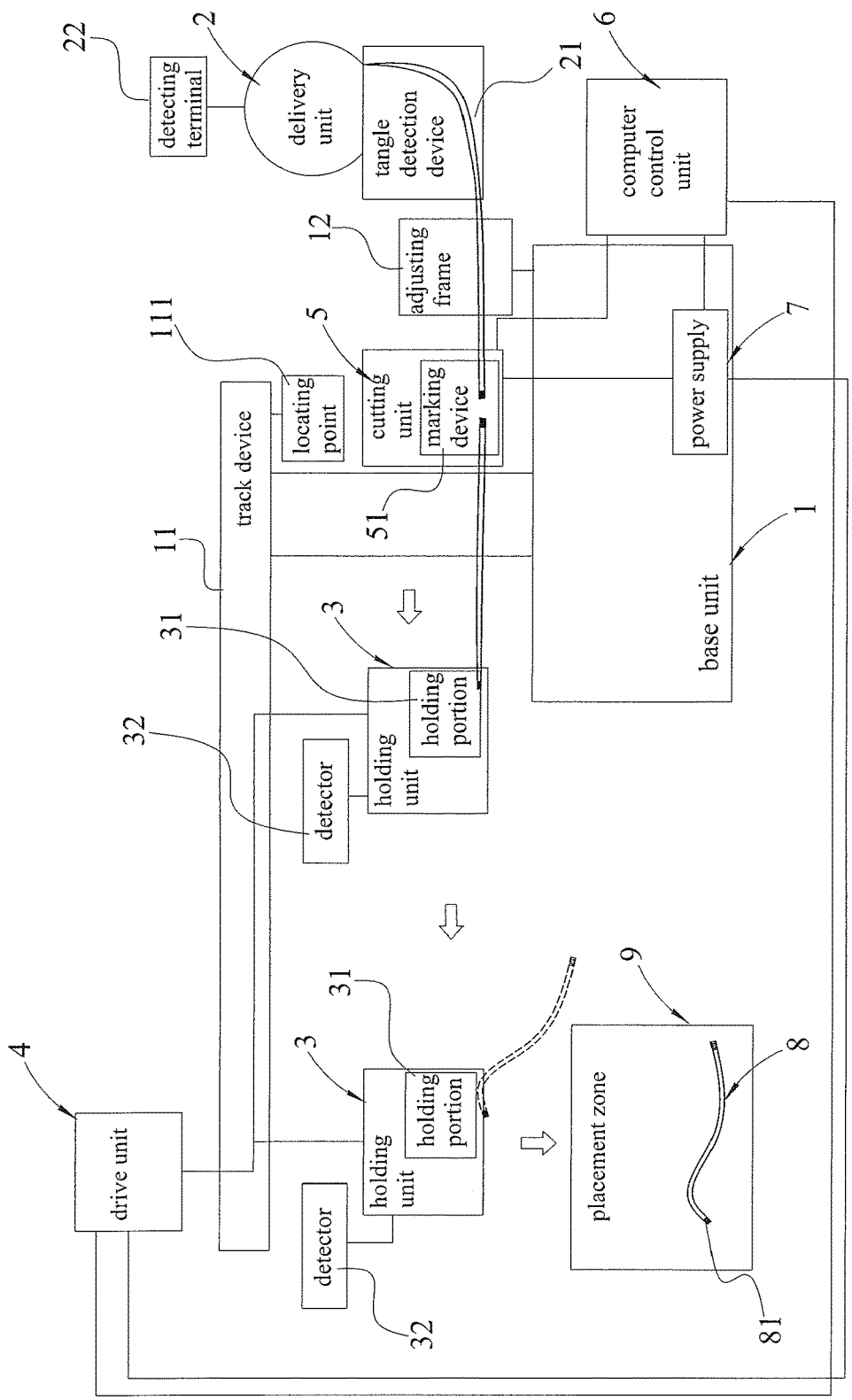
FIG. 4 is a schematic operational block diagram of the heading machine in accordance with the preferred embodiment of the present invention.

Referring to FIGS. 1-4, a heading machine in accordance with the preferred embodiment of the present invention comprises a base unit 1, a delivery unit 2 arranged on the base unit 1, two holding units 3 arranged on the base unit 1, a drive unit 4 arranged on the base unit 1, a cutting unit 5 arranged on the delivery unit 2, a computer control unit 6 arranged on the base unit 1, and a power supply 7 electrically coupled to the drive unit 4, the cutting unit 5 and the computer control unit 6 to provide an electric power.

The base unit 1 includes a track device 11 arranged transversely on an upper end of the base unit 1, and an adjusting frame 12 arranged on a side of the base unit 1.

The delivery unit 2 delivers a lace 8 which is wound around the adjusting frame 12 which adjusts a tension of the lace 8.

The two holding units 3 are movable transversely on the track device 11 of the base unit 1 to pull the lace 8 that is delivered from the delivery unit 2. Each of the two holding units 3 has a holding portion 31 for holding the lace 8.

The drive unit 4 is arranged on the track device 11 of the base unit 1 and drives the two holding units 3.

The cutting unit 5 cuts the lace 8 that is stretched from the delivery unit 2 and forms a fray check on a rear end of the lace 8 that has been cut, to prevent the lace 8 from being dispersed due to fray.

The computer control unit 6 is electrically coupled to the drive unit 4 to control operation of the drive unit 4.

In the preferred embodiment of the present invention, the track device 11 of the base unit 1 has a front end provided with a locating point 111. When the two holding units 3 are moved on the track device 11 of the base unit 1, the computer control unit 6 adjusts a movement distance according to the locating point 111 and performs a calibration by the locating point 111.

In the preferred embodiment of the present invention, the base unit 1 further includes a protecting device to protect an operator.

In the preferred embodiment of the present invention, the delivery unit 2 is provided with a tangle detection device 21 electrically coupled to the computer control unit 6 to pull the lace 8 and to detect a tangled or knotted condition of the lace 8.

In the preferred embodiment of the present invention, the delivery unit 2 is further provided with a detecting terminal 22 electrically coupled to the computer control unit 6 to detect a usage amount of the lace 8 at the delivery unit 2.

In the preferred embodiment of the present invention, each of the two holding units 3 is provided with a detector 32 which is electrically coupled to the computer control unit 6 through each of the two holding units 3 to prevent the two holding units 3 from hitting each other during displacement. In the preferred embodiment of the present invention, the drive unit 4 is selected from a step motor or a servo motor.

In the preferred embodiment of the present invention, the cutting unit 5 is provided with a marking device 51 to mark the fray check of the lace 8.

In the preferred embodiment of the present invention, the marking device 51 includes a painted color or a mounting ring.

In the preferred embodiment of the present invention, the computer control unit 6 includes a housing 61, a circuit board 62 received in the housing 61, a control panel 63 mounted outside of the housing 61 and electrically coupled to the circuit board 62 to operate the computer control unit 6, and a display panel 64 electrically coupled to the circuit board 62, to indicate a usage state and an information.

In operation, the operator inputs an information of the required length into the computer control unit 6 which controls operation of the drive unit 4 which drives the two holding units 3 which are moved to pull the lace 8 of the delivery unit 2 to a predetermined length. Then, the cutting unit 5 cuts the lace 8 that is stretched from the delivery unit 2, and forms a fray check on two opposite ends of the lace 8 that has been cut. Then, the two holding units 3 are moved on the track device 11 of the base unit 1 to convey the lace 8 to a placement zone 9. At this time, the drive unit 4 drives the two holding units 3 which are moved to the locating point 111 of the track device 11 of the base unit 1, so that the two holding units 3 pull the lace 8 from the locating point 111 to reduce the error.

In addition, when one of the two holding units 3 pulls the lace 8 to the placement zone 9, the holding portion 31 of the other one of the two holding units 3 clamps and stretches the head 81 of the lace 8 along the track device 11 of the base unit 1, to pull the lace 8 to the predetermined length for cutting of the cutting unit 5. Thus, the two holding units 3 pulls the lace 8 in an alternating manner without incurring a time delay, to enhance the cutting efficiency of the cutting unit 5.

Moreover, the protecting device is mounted outside of the base unit 1 to protect the operator during operation of the heading machine.

Further, when the lace 8 is tangled or knotted during the stretching process, the tangle detection device 21 of the delivery unit 2 detects the tangled or knotted condition of the lace 8 and transmits a signal to the computer control unit 6 which stops operation of the heading machine, to prevent the tangled lace 8 from being cut by the cutting unit 5, and to save the material of the lace 8.

Further, the detecting terminal 22 of the delivery unit 2 detects the amount of the lace 8, so that when the lace 8 is exhausted, the detecting terminal 22 transmits a signal to the computer control unit 6 which stops operation of the heading machine, to facilitate the operator supplementing the lace 8.

Further, the detector 32 of each of the two holding units 3 detects if the two holding units 3 are too close, to prevent the two holding units 3 from hitting each other during displacement.

Further, the control panel 63 of the computer control unit 6 controls the drive unit 4 to adjust the pulling size, without needing a manual calibration, thereby saving the time and procedure of calibration.

It is appreciated that, the marking device 51 of the cutting unit 5 marks the fray check of the lace 8, so that the rear end of the lace 8 has different variations. For example, different sizes are marked by different colors. Besides, the rear end of the lace 8 that has been cut is marked by patterns or figures to enhance the aesthetic quality of the lace 8 and to attract the consumer.

In conclusion, the lace 8 is arranged on the delivery unit 2 and is delivered to the adjusting frame 12 which adjusts the tension of the lace 8. The lace 8 extends through the adjusting frame 12 to reach the cutting unit 5. The drive unit 4 drives the two holding units 3 which are moved to pull the lace 8 to the predetermined length. Then, the cutting unit 5 cuts the lace 8 into sections, and forms a fray check on two opposite ends of the lace 8 that has been cut. Then, the two holding units 3 are moved on the track device 11 of the base unit 1 to convey the lace 8 to the placement zone 9. When one of the two holding units 3 pulls the lace 8 that has been cut, the other one of the two holding units 3 stretches the lace 8 that is not processed, so that the cutting unit 5 performs the cutting action successively, thereby enhancing the cutting efficiency and the working circulation. The computer control unit 6 controls the drive unit 4 to directly adjust the cut length, and the two holding units 3 are moved to pass the locating point 111 at each time, so that after the lace 8 is pulled out by the two holding units 3, the pulling length is recalculated, thereby preventing the preset size from being deviated more and more due to the error.

Accordingly, the computer control unit 6 adjusts the length of the lace 8 exactly, so that the tension of the lace 8 is distributed evenly, and the lace 8 that has been cut will have a constant length. In addition, the cut length of the lace 8 is adjusted automatically without needing manual measurement and adjustment, thereby enhancing the working efficiency of the heading machine, thereby reducing the length error, and thereby increasing the quality of the product.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A heading machine comprising:
   a base unit (1);
   a delivery unit (2) arranged on the base unit;
   two holding units (3) arranged on the base unit;
   a drive unit (4) arranged on the base unit;
   a cutting unit (5) arranged on the delivery unit;
   a computer control unit (6) arranged on the base unit; and
   a power supply (7) electrically coupled to the drive unit, the cutting unit and the computer control unit to provide an electric power;
   wherein:
   the base unit includes a track device (11) arranged transversely on an upper end of the base unit, and an adjusting frame (12) arranged on a side of the base unit;

the delivery unit delivers a lace (8) which is wound around the adjusting frame which adjusts a tension of the lace;

the two holding units are movable transversely on the track device of the base unit to pull the lace that is delivered from the delivery unit;

the lace is clamped and disposed at clamped state by the two holding units;

each of the two holding units has a holding portion (31) for holding the lace;

the drive unit is arranged on the track device of the base unit and drives the two holding units;

the cutting unit cuts the lace that is stretched from the delivery unit and forms a fray check on a rear end of the lace that has been cut, to prevent the lace from being dispersed due to fray;

the cutting unit cuts the lace and forms a head on the lace; and the computer control unit is electrically coupled to the drive unit to control operation of the drive unit.

2. The heading machine of claim 1, wherein:

the track device of the base unit has a front end provided with a locating point (111); and when the two holding units are moved on the track device of the base unit, the computer control unit adjusts a movement distance according to the locating point and performs a calibration by the locating point.

3. The heading machine of claim 1, wherein the base unit further includes a protecting device to protect an operator.

4. The heading machine of claim 1, wherein the delivery unit is provided with a tangle detection device (21) electrically coupled to the computer control unit to pull the lace and to detect a tangled or knotted condition of the lace.

5. The heading machine of claim 4, wherein the delivery unit is further provided with a detecting terminal (22) electrically coupled to the computer control unit to detect a usage amount of the lace at the delivery unit.

6. The heading machine of claim 1, wherein each of the two holding units is provided with a detector (32) which is electrically coupled to the computer control unit through each of the two holding units to prevent the two holding units from hitting each other during displacement.

7. The heading machine of claim 1, wherein the drive unit is selected from a step motor or a servo motor.

8. The heading machine of claim 1, wherein the cutting unit is provided with a marking device (51) to mark the fray check of the lace.

9. The heading machine of claim 8, wherein the marking device includes a painted color or a mounting ring.

10. The heading machine of claim 1, wherein the computer control unit includes a housing (61), a circuit board (62) received in the housing, a control panel (63) mounted outside of the housing and electrically coupled to the circuit board to operate the computer control unit, and a display panel (64) electrically coupled to the circuit board, to indicate a usage state and an information.

11. The heading machine of claim 1, wherein when one of the two holding units pulls the lace to a placement zone, the holding portion of the other one of the two holding units clamps and stretches the head of the lace along the track device of the base unit.

12. The heading machine of claim 2, wherein the two holding units are moved on the track device of the base unit and pass the locating point at each time, so that after the lace is pulled out by the two holding units, a pulling length of the lace is recalculated.

* * * * *